US010371278B2

(12) United States Patent
Pellmann et al.

(10) Patent No.: US 10,371,278 B2
(45) Date of Patent: Aug. 6, 2019

(54) SYSTEMS AND METHODS FOR AN ELECTROMAGNETIC ACTUATOR HAVING A UNITARY POLE PIECE

(71) Applicant: HUSCO Automotive Holdings LLC, Waukesha, WI (US)

(72) Inventors: Matt Pellmann, Summit, WI (US); Brian Heidemann, Lake Mills, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 15/452,663

(22) Filed: Mar. 7, 2017

(65) Prior Publication Data

US 2017/0254437 A1 Sep. 7, 2017

Related U.S. Application Data

(60) Provisional application No. 62/304,607, filed on Mar. 7, 2016, provisional application No. 62/385,042, filed on Sep. 8, 2016.

(51) Int. Cl.

| | |
|---|---|
| ***H01F 5/00*** | (2006.01) |
| ***F16K 31/06*** | (2006.01) |
| ***H01F 7/126*** | (2006.01) |
| ***H01F 7/16*** | (2006.01) |
| ***H01F 7/08*** | (2006.01) |

(Continued)

(52) U.S. Cl.

CPC ........ *F16K 31/0675* (2013.01); *F16K 27/029* (2013.01); *H01F 7/081* (2013.01); *H01F 7/126* (2013.01); *H01F 7/129* (2013.01); *H01F 7/1607* (2013.01); *H01F 2007/083* (2013.01); *H01F 2007/085* (2013.01)

(58) Field of Classification Search

CPC .... H01F 7/1607; H01F 7/126; F16K 31/0675; F16K 27/04; F16K 31/613; F16K 3/0209; F16K 3/0218; F16K 3/0254

USPC .......................................................... 335/299

See application file for complete search history.

(56) References Cited

U.S. PATENT DOCUMENTS

| | | |
|---|---|---|
| 4,725,039 A | 2/1988 | Kolchinsky |
| 4,744,389 A | 5/1988 | Ichihashi |
| 4,809,749 A | 3/1989 | Ichihashi |

(Continued)

FOREIGN PATENT DOCUMENTS

| | | |
|---|---|---|
| DE | 102011053033 A1 | 2/2013 |
| DE | 102013211816 A1 | 12/2014 |

(Continued)

OTHER PUBLICATIONS

PCT International Search Report and Written Opinion, PCT/US2017/021218, dated Jun. 12, 2017.

(Continued)

*Primary Examiner* — Shawki S Ismail
*Assistant Examiner* — Lisa N Homza
(74) *Attorney, Agent, or Firm* — Quarles & Brady LLP

(57) ABSTRACT

An electromagnetic actuator having a unitary pole piece arranged within and coupled to a housing is provided. The housing is coupled to the unitary pole piece such that a load on the unitary pole piece is reduced during assembly and/or installation of the electromagnetic actuator. The unitary pole piece is structured to reduce leakage past an armature slidably received within the pole piece.

34 Claims, 13 Drawing Sheets

(51) Int. Cl.

| | |
|---|---|
| ***H01F 7/129*** | (2006.01) |
| ***F16K 27/02*** | (2006.01) |

(56) References Cited

U.S. PATENT DOCUMENTS

| | | | | | |
|---|---|---|---|---|---|
| 4,919,390 | A | 4/1990 | Ichiryu et al. | | |
| 5,050,840 | A | 9/1991 | Kondo et al. | | |
| 6,498,416 | B1 | 12/2002 | Oishi et al. | | |
| 6,501,359 | B2 | 12/2002 | Matsusaka et al. | | |
| 6,564,443 | B2 | 5/2003 | Oishi et al. | | |
| 6,702,253 | B2 | 3/2004 | Noller et al. | | |
| 6,987,437 | B2 | 7/2006 | Matsusaka et al. | | |
| 7,234,681 | B2 * | 6/2007 | Hiddessen | F16K 31/06 | 251/129.15 |
| 7,468,647 | B2 * | 12/2008 | Ishibashi | F16K 31/0613 | 251/129.15 |
| 7,581,302 | B2 | 9/2009 | Tyler | | |
| 8,081,053 | B2 | 12/2011 | Yamagata et al. | | |
| 8,109,487 | B2 | 2/2012 | Kokubu et al. | | |
| 8,134,436 | B2 | 3/2012 | Yasoshima | | |
| 8,264,313 | B2 | 9/2012 | Sasao et al. | | |
| 8,490,586 | B2 | 9/2013 | Ross et al. | | |
| 8,643,452 | B2 | 2/2014 | Mehta | | |
| 8,791,780 | B2 | 7/2014 | Boban et al. | | |
| 8,810,346 | B2 | 8/2014 | Goubely et al. | | |
| 8,928,439 | B2 | 1/2015 | Stitz | | |
| 8,994,484 | B2 | 3/2015 | Ando et al. | | |
| 9,046,188 | B2 | 6/2015 | Frippiat et al. | | |
| 9,133,956 | B2 | 9/2015 | Roether et al. | | |
| 9,318,246 | B2 | 4/2016 | Irie et al. | | |
| 9,470,332 | B2 | 10/2016 | Miura | | |
| 9,478,340 | B2 | 10/2016 | Mehta | | |
| 9,528,626 | B2 | 12/2016 | Holmes et al. | | |
| 9,599,249 | B2 | 3/2017 | Holmes et al. | | |
| 2003/0075702 | A1 * | 4/2003 | Isobe | F16K 31/0613 | 251/129.15 |
| 2016/0017991 | A1 * | 1/2016 | Boban | F16H 61/30 | 137/625.18 |
| 2016/0084397 | A1 * | 3/2016 | Boban | F16K 31/0613 | 137/238 |
| 2017/0011833 | A1 | 1/2017 | Mehta | | |
| 2017/0045154 | A1 | 2/2017 | Boban et al. | | |

FOREIGN PATENT DOCUMENTS

| | | | |
|---|---|---|---|
| DE | 102015120982 | A1 | 1/2017 |
| DE | 102016105203 | A1 | 1/2017 |
| DE | 10201511242 | A1 | 2/2017 |
| EP | 3070721 | A2 | 9/2016 |
| WO | 2016136394 | A1 | 1/2016 |
| WO | 2016026690 | A1 | 2/2016 |
| WO | 2016130871 | A1 | 8/2016 |
| WO | 2017005493 | A1 | 1/2017 |
| WO | 2017005494 | A1 | 1/2017 |
| WO | 2017005496 | A1 | 1/2017 |
| WO | 2017005497 | A1 | 1/2017 |
| WO | 2017005498 | A1 | 1/2017 |

OTHER PUBLICATIONS

DE102016105203A1, Machine English translated Abstract.
DE102015120982A1 Machine English translated Abstract.
DE102015112402A1, Machine English translated Abstract.
DE102011053033A1, English Abstract.

* cited by examiner

SYSTEMS AND METHODS FOR AN ELECTROMAGNETIC ACTUATOR HAVING A UNITARY POLE PIECE

CROSS-REFERENCES TO RELATED APPLICATIONS

The present application is based on and claims priority to U.S. Provisional Patent Application No. 62/304,607, filed on Mar. 7, 2016, and entitled "Systems and Methods for An Electromagnetic Actuator Having a Unitary Pole Piece," and U.S. Provisional Patent Application No. 62/385,042, filed on Sep. 8, 2016, and entitled "Systems and Methods for An Electromagnetic Actuator Having a Unitary Pole Piece." The entire disclosures of which are hereby incorporated herein by reference in their entirety.

STATEMENT REGARDING FEDERALLY SPONSORED RESEARCH

Not Applicable.

BACKGROUND

The present invention relates generally to electromagnetic actuators and, more specifically to systems and method for an electromagnetic actuator having a unitary pole piece.

Electromagnetic actuators (e.g., a variable force solenoid) typically include a wire coil positioned within a housing and around a moveable armature. A current can be applied to the wire coil to produce a magnetic field which can then actuate (i.e., move) the moveable armature with respect to the housing. Typically, a pole piece is arranged within the housing to direct the magnetic field generated by the wire coil and influence an output force provided by actuation of the moveable armature. Current pole piece designs may not ensure that the armature cavity, or recess, is effectively (e.g., to prevent fluid leakage pathways) sealed. In addition, the design of current pole pieces can result in flux leakage around the armature. Some of these designs are susceptible to forces applied to the pole piece during assembly and/or installation, which can alter the performance of the electromagnetic actuator.

SUMMARY OF THE INVENTION

The aforementioned deficiencies can be overcome by providing an electromagnetic actuator having a unitary pole piece arranged within and coupled to a housing. The housing can be coupled to the unitary pole piece such that a load on the unitary pole piece can be reduced during assembly and/or installation of the electromagnetic actuator. The unitary pole piece can be structured to reduce leakage past an armature slidably received within the pole piece.

In one aspect, the present invention provides an electromagnetic actuator including a housing and a unitary pole piece at least partially arranged within the housing. The unitary pole piece includes a first end, a side wall defining a choke portion, and a mounting surface extending from a distal end of the side wall. The first end and the side wall define an armature recess. The electromagnetic actuator further includes an end cap arranged around the unitary pole piece adjacent to the first end, an armature slidably received with the armature recess of the unitary pole piece, and a wire coil arranged within the housing and positioned around the armature.

In another aspect, the present invention provides a control valve including a valve body having a valve element arranged therein, and an electromagnetic actuator coupled to the valve body. The electromagnetic actuator includes a housing and a unitary pole piece at least partially arranged within the housing. The unitary pole piece includes a first end, a side wall defining a choke portion, and a mounting surface extending from a distal end of the side wall. The first end and the side wall define an armature recess. The electromagnetic actuator further includes an end cap arranged around the unitary pole piece adjacent to the first end, an armature slidably received with the armature recess of the unitary pole piece and coupled to the valve element, and a wire coil arranged within the housing and positioned around the armature. The valve body is at least partially arranged within the armature recess of the unitary pole piece.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

Figure 1:
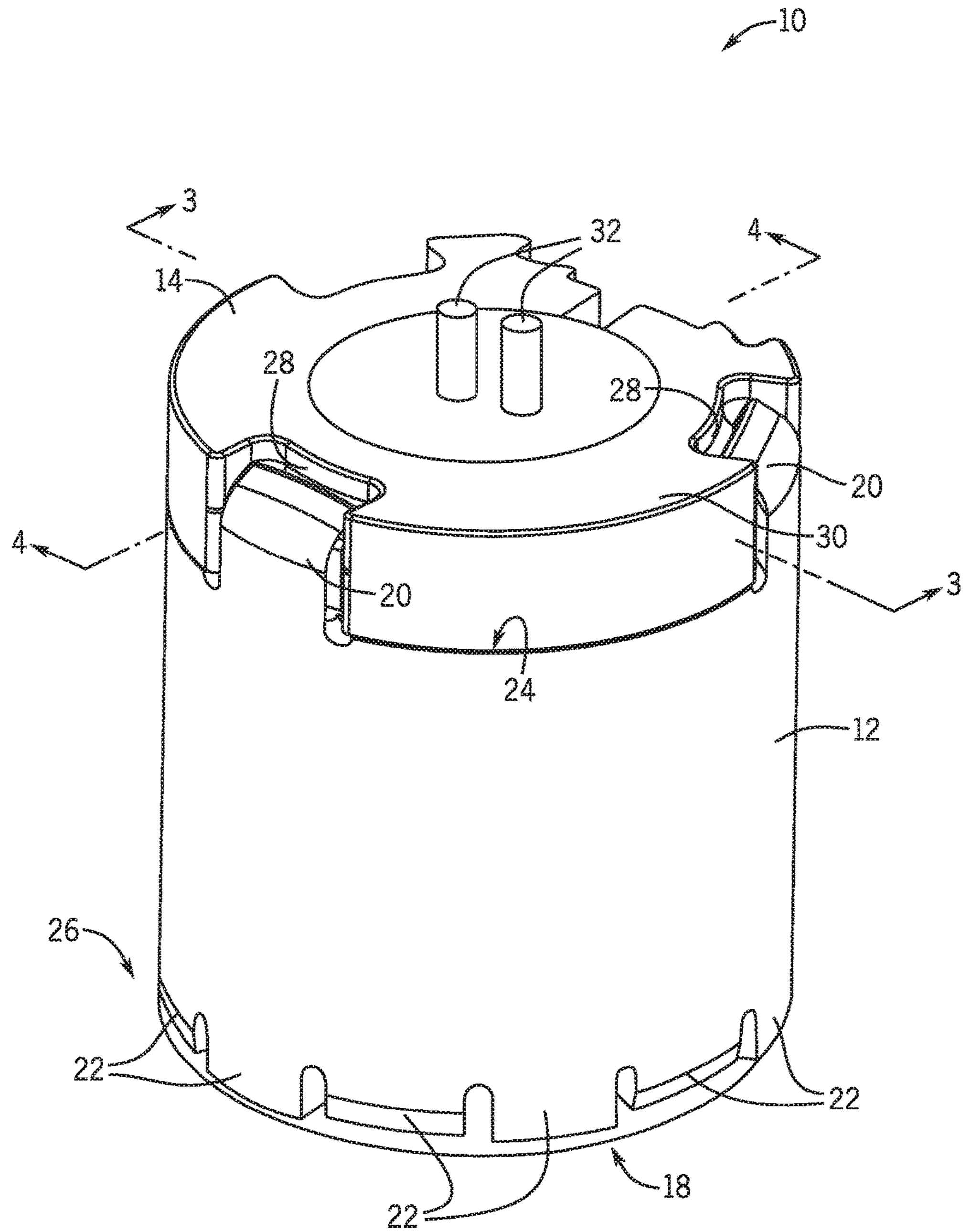
FIG. 1 is a perspective view of an electromagnetic actuator according to one embodiment of the present invention.
Figure 2:
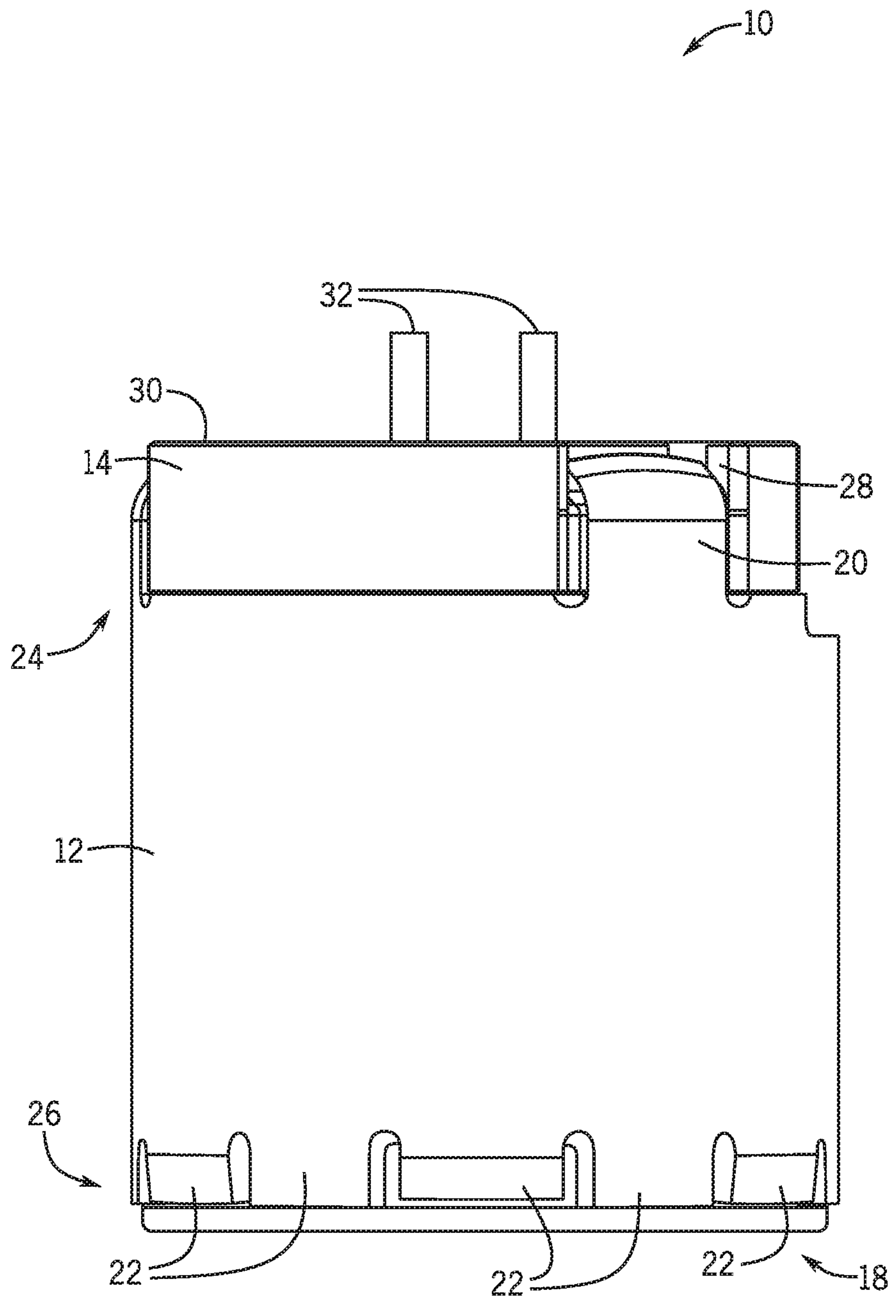
FIG. 2 is a side view of the electromagnetic actuator of FIG. 1.

FIGS. 1 and 2 show an electromagnetic actuator 10 according to one embodiment of the present invention. The electromagnetic actuator 10 can include a housing 12, an end cap 14, and a unitary pole piece 18. The housing 12 can define a generally cylindrical shape and can be fabricated from a magnetic material (e.g., magnetic steel, iron, nickel, etc.). In other non-limiting examples, the housing 12 may define another shape, as desired. The housing 12 can include a plurality of end cap protrusions 20 and a plurality of pole piece protrusions 22.

The plurality of end cap protrusions 20 can protrude from a first side 24 of the housing 12 adjacent to the end cap 14. The plurality of end cap protrusions 20 can be arranged circumferentially around the first side 24 of the housing 12. The illustrated housing 12 can include three end cap protrusions 20 circumferentially arranged in approximately 120° increments around the first side 24 of the housing 12. In other embodiments, the housing 12 can include more or less than three end cap protrusions 20 arranged circumferentially in any increments around the first side 24 of the housing 12. When the electromagnetic actuator 10 is assembled, as shown in FIGS. 1 and 2, the plurality of end cap protrusions 20 can be crimped, or bent, to engage the end cap 14 thereby securing the first side 24 of the housing 12 to the end cap 14.

The plurality of pole piece protrusions 22 can protrude from a second side 26 of the housing 12 opposite to the first side 24. The plurality of pole piece protrusions 22 can be arranged circumferentially around the second side 26 of the housing 12. The illustrated housing 12 can include twelve pole piece protrusions 22 circumferentially arranged in approximately 30° increments around the second side 26 of the housing 12. In other embodiments, the housing 12 can include more or less than twelve pole piece protrusions 22 arranged circumferentially in any increments around the second side 26 of the housing 12. When the electromagnetic actuator 10 is assembled, as shown in FIGS. 1 and 2, the plurality of pole piece protrusions 22 can be crimped, or bent, to engage the unitary pole piece 18 in an alternating fashion. That is, alternating pairs of the plurality of pole piece protrusions 22 can be crimped, or bent, to engage the unitary pole piece 18 such that between each alternating pair of crimped pole piece protrusions there is a pole piece protrusion that is not crimped, or bent. In this way, the pole piece protrusions 22 can secure the second side 26 of the housing 12 to the unitary pole piece 18. In other embodiments, the more or less of the plurality of pole piece protrusions 22 can be crimped to the unitary pole piece 18 when the electromagnetic actuator 10 is assembled. It should be appreciated that, for example, a staking process (i.e., punching portions of the housing 12 into the unitary pole piece 18) may alternatively be applied to couple the housing 12 to the unitary pole piece 18.

The end cap 14 can be fabricated from a magnetic material (e.g., powdered metal, magnetic steel, iron, nickel, etc.). The end cap 14 can include a plurality of cap recesses 28 arranged circumferentially around a periphery of the end cap 14. The plurality of cap recesses 28 correspond with the plurality of end cap protrusions 20 such that each one of the plurality of end cap protrusions 20 are configured to crimped into a corresponding one of the plurality of cap recesses 28. The plurality of cap recesses 28 can be dimensioned to arrange the distal ends of the plurality of end cap protrusions 20 substantially flush with a top surface 30 of the end cap 14, when assembled.

A connector (not shown) can be mounted adjacent to the top surface 30 of the end cap 14. The connector (not shown) can be fabricated from a non-magnetic material (e.g., plastic) and can include a pair of electrical contacts 32. The electrical contacts 32 can be fabricated from an electrically conductive material (e.g., aluminum, copper, etc.). In operation, the electrical contacts 32 can be in electrical communication with a controller (not shown) configured to control the operation of the electromagnetic actuator 10. It should be appreciated that the number and arrangement of the electrical contacts 32 is not meant to be limiting in any way and can vary based on the application of the electromagnetic actuator 10.

Figure 3:
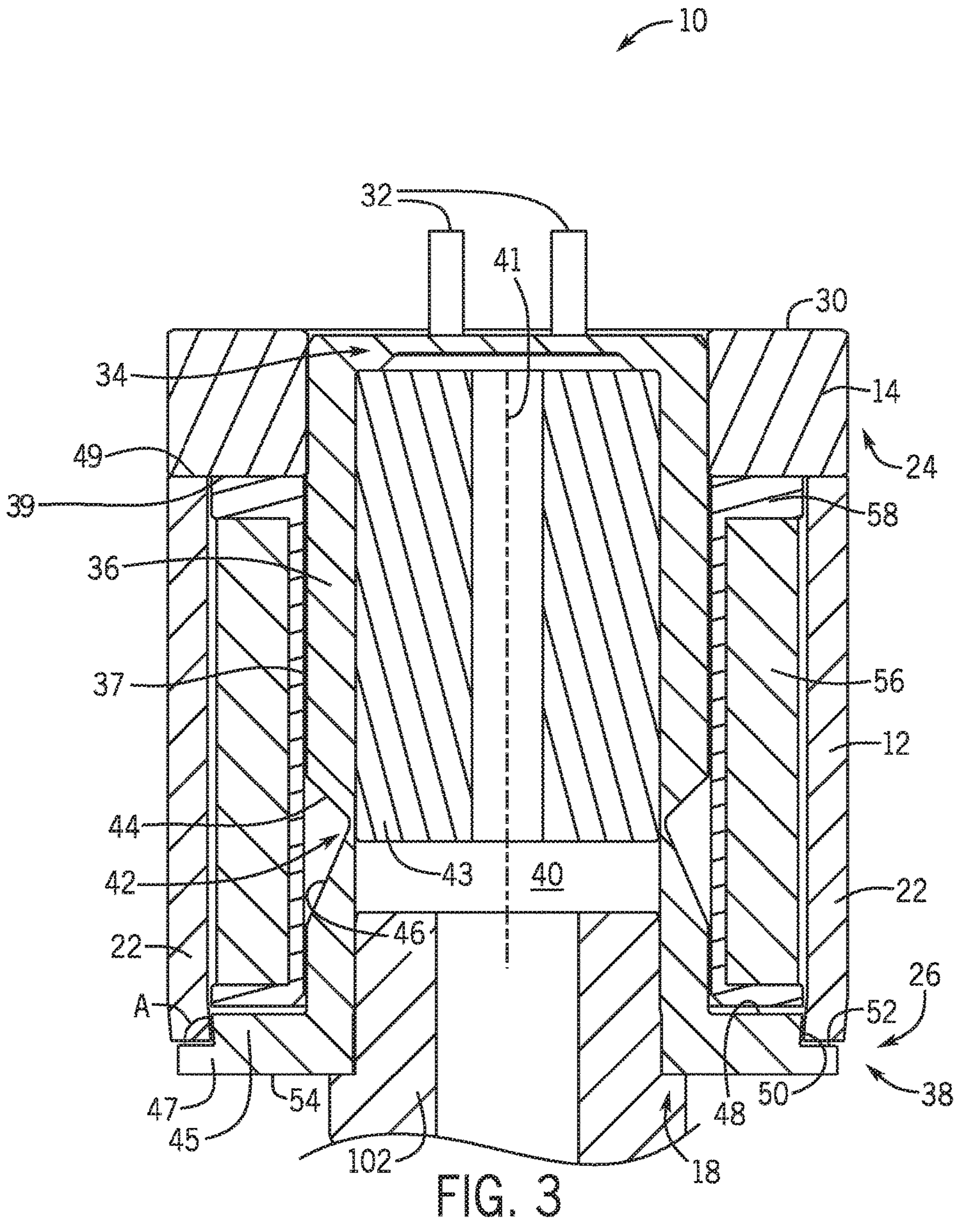
FIG. 3 is a cross-sectional view of the electromagnetic actuator of FIG. 1 taken along line 3-3.
Figure 4:
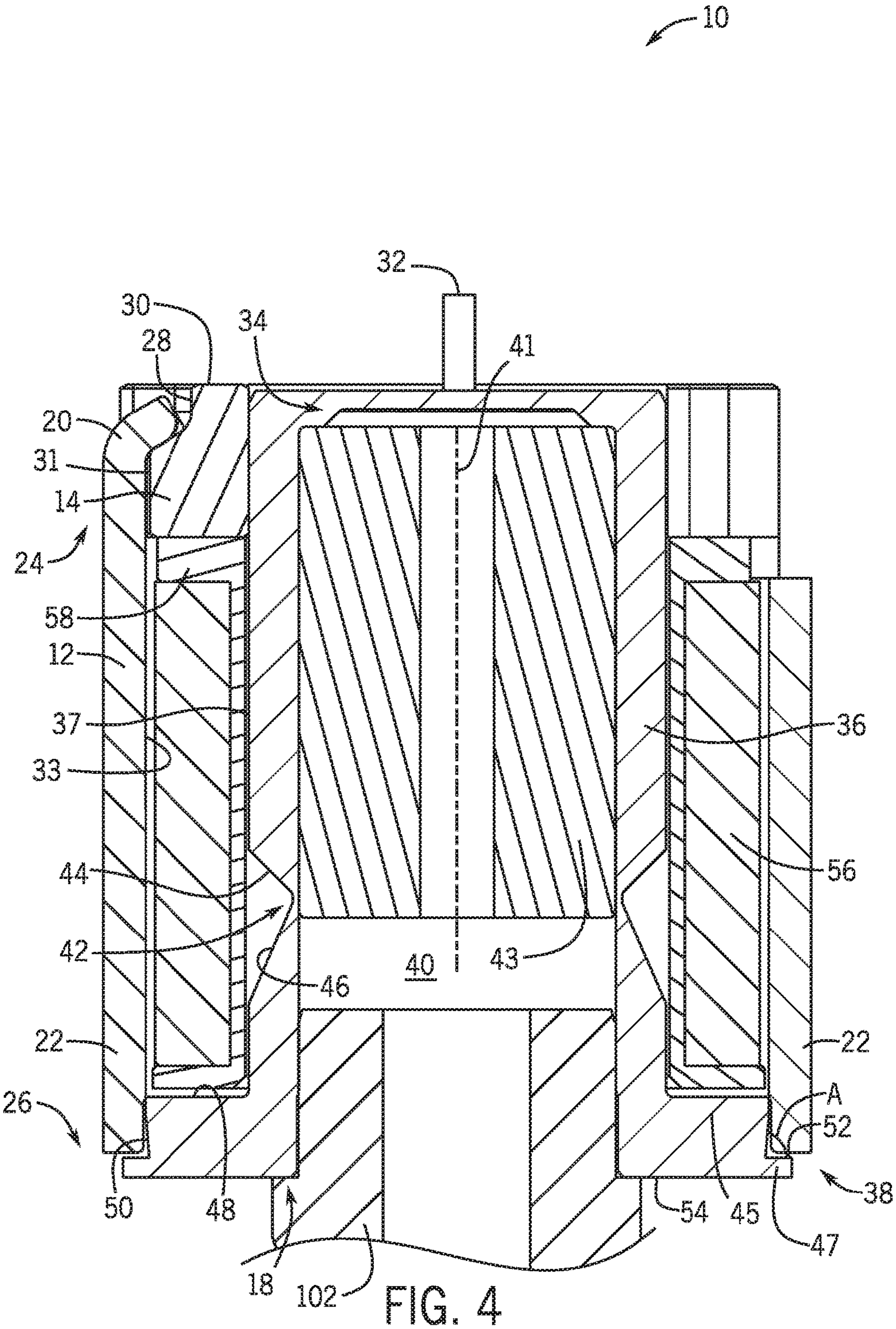
FIG. 4 is a cross-sectional view of the electromagnetic actuator of FIG. 1 taken along line 4-4.

Turning to FIGS. 3 and 4, the unitary pole piece 18 can be fabricated from a magnetic material (e.g., magnetic steel, iron, nickel, etc.) and can include a first end 34, a side wall 36, a mounting flange 38, and an armature recess 40. The first end 34 can be arranged adjacent to the end cap 14, when assembled.

The side wall 36 of the unitary pole piece 18 can extend substantially perpendicularly from the first end 34. The side wall 36 can define a choke portion 42. The choke portion 42 may define a radial recess, or reduction in radial thickness, of the side wall 36. The choke portion 42 is dimensioned to ensure that magnetic saturation occurs in the choke portion 42 during operation of the electromagnetic actuator 10. That is, a radial cross-sectional area defined by the choke portion 42 ideally would be zero to ensure that magnetic saturation occurs within the choke portion 42, but structural requirements dictate that the choke portion 42 define a measureable cross-sectional area. As will be described herein, the structure and properties of the electromagnetic actuator 10 eliminate or significantly reduce a load applied to the choke portion 42 both during manufacture and operation, which enables the choke portion 42 to define a significantly reduced radial cross-sectional thickness.

The illustrated side wall 36 includes a first tapered surface 44 and a second tapered surface 46 with the choke portion 42 arranged therebetween. The first tapered surface 42 and the second tapered surface 44 can both taper toward the choke portion 42 thereby forming a generally V or U-shaped radial recess in the side wall 36. It should be appreciated that the shape of the structure that forms the choke portion 42 is not meant to be limiting in any way. That is, in other embodiments, the choke portion 42 may be formed via one or more curved surfaces, an arcuate surface, and/or a notch, to name a few.

The unitary pole piece 18 can include the armature recess 40, which is defined by an interior cavity formed by the first end 34 and the side wall 36. The armature recess 40 can slidably receive an armature 43 therein. The armature recess 40 may completely enclose or seal the armature 43 therein. That is, the armature recess 40 may be sealed behind the armature 43 and in front of the armature 43 by a continuous surface defined by the unitary pole piece 18. Specifically, the first end 34, the side wall 36, and the mounting surface 54 define a continuous surface that extends along the armature recess 40. In application, the electromagnetic actuator 10 may be mounted to a structure such that a seal is formed between the mounting surface 54 and the structure. Thus, when installed, the continuous surface defined along the mounting surface 54, the side wall 36, and the first end 34 can completely seal the entire armature recess 40 and the armature 43 slidably arranged therein. The armature 43 can be fabricated from a magnetic material (e.g., magnetic steel, iron, nickel, etc.). The armature 43 can include a central aperture extending longitudinally through the armature 43. In the illustrated non-limiting example, the housing 12, the end cap 14, the unitary pole piece 18, and the armature 43 may define a common central axis 41.

The mounting flange 38 may extend radially outward from a distal end of the side wall 36 opposite to the first end 34. The mounting flange 38 can define a substantially stepped profile including a first flanged portion 45 and a second flanged portion 47 that can define a larger diameter than the first flanged portion 45. The first flanged portion 45 can include a bobbin surface 48 extending substantially perpendicularly from the side wall 36 and an angled surface 50 extending from a distal end of the bobbin surface 48 toward the second flanged portion 47. Specifically, the angled surface 50 can extend toward a housing surface 52 of the second flanged portion 47 such that an angle A between the angled surface 50 and the housing surface 52 can be between approximately 70° and 90°. In other embodiments, the angle A can be between approximately 75° and 85°. When assembled, the alternating pairs of the plurality of pole piece protrusions 22 can be crimped, or bent, to engage the angled surface 50 thereby securing the housing 12 to the unitary pole piece 18. Also, the alternating pairs of the plurality of pole piece protrusions 22 that are not crimped, or bent, can engage the housing surface 52.

The mounting flange 38 can include a mounting surface 54 configured to engage a structure that the electromagnetic actuator 10 can be coupled to in application. The mounting surface 54 can extend substantially perpendicularly from the distal end of the side wall 36 toward the second flanged portion 47. That is, the mounting surface 54 may extend radially outward from a distal end of the side wall 36. The mounting surface 54 can be spaced from the bobbin surface 48 to define a thickness of the mounting flange 38.

With continued reference to FIGS. 3 and 4, the electromagnetic actuator 10 can include a wire coil 56 arranged within the housing 12. The wire coil 56 can be wrapped around a bobbin 58 dimensioned to position the wire coil 56 within the housing 12 such that, when assembled, the wire coil 56 extends around the armature 43. The wire coil 56 can be fabricated, for example, from a copper coil that can be configured to produce a magnetic field, and thereby apply a force to the armature 43, in response to a current being applied to the wire coil 56. The magnitude of the magnetic field, and the force, produced by the wire coil 56 can be determined by the magnitude of the current applied to the wire coil 56. As described above, the electromagnetic actuator 10 may be in electrical communication with a controller (not shown) via the electrical contacts 32. In some embodiments, the controller (not shown) can be configured to selectively apply a current to the wire coil 56 at a desired magnitude.

The bobbin 58 can be fabricated from a non-magnetic material (e.g., plastic). In some embodiments, the bobbin 58 can be integrally formed with the connector (not shown). That is, the connector (not shown) and the bobbin 58 can be formed using a single part.

Since the armature 43 can be slidably received within the armature recess 40 defined by the unitary pole piece 18, the armature 43 can be selectively moveable axially within the armature recess 40 between one or more positions in response to the force produced by the magnetic field of the wire coil 56.

In operation, the electromagnetic actuator 10 may be utilized, for example, as a variable force solenoid, and/or the electromagnetic actuator 10 may be integrated into a control valve arrangement. In either case, the electromagnetic actuator 10 may be coupled to an application structure 102. In some non-limiting examples, the application structure 102 may be in the form of a secondary pole piece 102. In some non-limiting examples, the application structure 102 may be a valve body 102.

Figure 5:
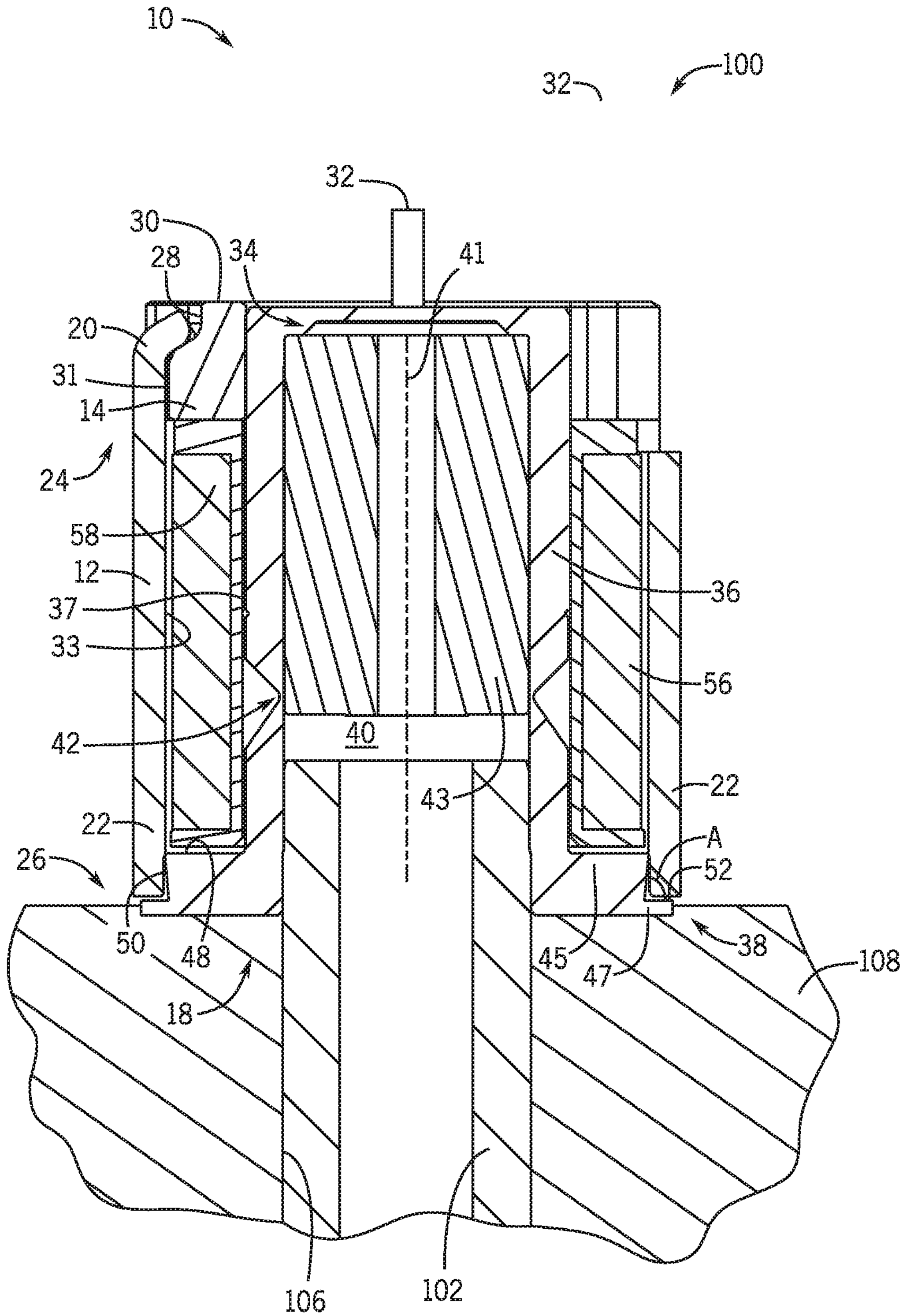
FIG. 5 is a schematic illustration of the electromagnetic actuator of FIG. 1 integrated into a control valve according to one embodiment of the present invention.
Figure 7:
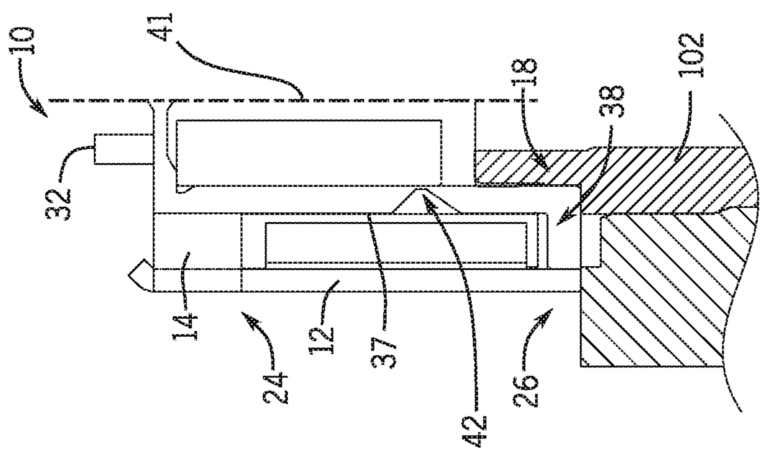
FIG. 7 is a schematic illustration of an electromagnetic actuator with a housing press-fit to a pole piece and crimped to an end cap according to still another embodiment of the present invention.
Figure 6:
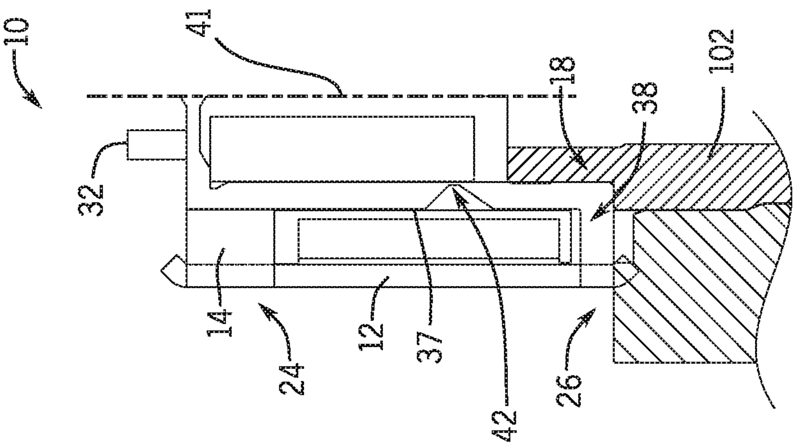
FIG. 6 is a schematic illustration of an electromagnetic actuator with a housing crimped to both an end cap and a pole piece according to yet another embodiment of the present invention.

One non-limiting application where the electromagnetic actuator 10 can be integrated into a control valve will be described with reference to FIGS. 1-5. As shown in FIG. 5, the electromagnetic actuator 10 can be integrated into a control valve 100. The control valve 100 can include a valve body 102 secured at least partially within the armature recess 40 defined by the unitary pole piece 18. The design of the electromagnetic actuator 10 enables the valve body 102 to only engage the armature recess 40 of the unitary pole piece 18 thereby simplifying the assembly of the control valve 100.

As is known in the art, the valve body 102 can include a valve element (not shown) slidably received with the valve body 102. The valve element (not shown) can be coupled to the armature 43 via a coupling element (not shown) such that the valve element (not shown) is moveable in response to axial actuation of the armature 43.

During installation, the valve body 102 can be inserted within a bore 106 defined by, for example, a mounting structure 108. In one embodiment, the mounting structure 108 may be in the form of an application structure 108. The valve body 102 can be inserted into the valve bore 106 until the mounting surface 54 of the mounting flange 38 engages the application structure 108. That is, the mounting surface 54 of the mounting flange 38 can act as a stop for the control valve 100 and define a depth that the valve body 102 is inserted into the bore 106. With the control valve body 102 inserted into the bore 106, in some embodiments, a retention device (not shown) (e.g., a clamp) can be installed to secure the control valve 100 onto the application structure 108. The retention device (not shown) can engage the end cap 14 to apply an installation force that axially forces the electromagnetic actuator 10 down onto the application structure 108. In the illustrated embodiment, the installation force may force the mounting surface 54 into engagement with the application structure 108, thereby providing a seal therebetween.

Once the control valve 100 is secured onto the application structure 108 by the retention device (not shown), the electromagnetic actuator 10 design can control a load applied to the choke portion 42 of the unitary pole piece 18. In particular, the retention device (not shown) can induce an axial installation force on the end cap 14 in a direction toward the application structure 108. The installation force may be transferred from the end cap 14 axially through the housing 12 to the mounting flange 38. Thus, an installation load, or force, acting on the electromagnetic actuator 10 can be distributed from the end cap 14 through the housing 12 and to the mounting flange 38 of the unitary pole piece 18 thereby bypassing the choke portion 42 of the unitary pole piece 18. This can enable the choke portion 42 to define a smaller cross-sectional area to aid in the magnetic performance of the electromagnetic actuator 10.

The design of the electromagnetic actuator 10 may further control a load applied to the choke portion 42 via the interaction between the housing 12 and the end cap 14. Prior to crimping, an interface between the end cap 14 and the housing 12 may be governed by an axial contact. That is, an axial surface 39 of the end cap 14 may be configured to interact with an axial surface 49 of the housing 12 during assembly of the electromagnetic actuator 10. The interaction between the axial surface 39 of the end cap 14 and the axial surface 49 of the housing 12 can occur on an axial plane (i.e., a plane that is perpendicular to the central axis 41). The axial engagement between the housing 12 and the end cap 14 allows for radial misalignment between the housing 12, the end cap 14, and the unitary pole piece 18, which eliminates bending moments that may have been applied to the choke portion 42 during manufacture. In addition, a radial gap can be arranged between an outer surface 31 of the end cap 14 and an inner surface 33 of the housing 12 adjacent to the plurality of end cap protrusions 20. This radial gap may further allow radial misalignment between the housing 12, the end cap 14, and the unitary pole piece 18 during assembly of the electromagnetic actuator 10.

Further, an interaction between the end cap 14 and the unitary pole piece 18 may eliminate or significantly reduce any loading applied to the choke portion 42 during manufacture of the electromagnetic actuator 10. In some embodiments, for example, a clearance fit may exist between an inner surface 35 of the end cap 14 and an outer surface 37 of the side wall 36. In these non-limiting examples, there would be no loading applied to the choke portion 42 during manufacture. In other embodiments, for example, the end cap 14 may be press-fit onto the outer surface 37 of the side wall 36. The press-fit arrangement may reduce an air gap between the end cap 14 and the unitary pole piece 18 thereby increasing an output force provided by the electromagnetic actuator 10 and reducing variation in the output force arising due to manufacturing variabilities. The press-fit engagement between the end cap 14 and the unitary pole piece 18 may minimally load the choke portion 42 during manufacture.

Thus, as described above, the design and properties of the electromagnetic actuator 10 control, and significantly reduce, any loading applied to the choke portion 42 of the unitary pole piece 18 during manufacture and/or in application.

In operation, the control valve body 102 can be in fluid communication with a process fluid (e.g., oil) and the valve element (not shown) within the valve body 102 can be actuated in response to axial movement of the armature 43. In some embodiments, the actuation of the valve element (not shown) can selectively provide and/or inhibit fluid communication between one or more ports (not shown) of the application structure 108. In some embodiments, the process fluid can be communicated into the armature recess 40. In these embodiments, the process fluid can act to provide dampening during actuation of the armature 43. As described above, the design of the unitary pole piece 18 (i.e., the continuous surface defined by the first end 34, the side wall 36, and the mounting surface 54) can completely seal the armature recess 40 and the armature 43 slidably received therein. This can aid in preventing leakage of the process fluid during actuation of the armature 43, which could result in reduced damping control. Specifically, during actuation of the armature 43, process fluid can travel through the armature 43 via the central aperture. Process fluid trapped behind the armature 43 (i.e., adjacent to the first end 34) can be forced toward the valve body 102 during movement of the armature 43, due to the enclosure of the armature 43 within the armature recess 40. In this way, the unitary pole piece 18 reduces leakage passageways and maintains damping control provided by the electromagnetic actuator 10.

FIGS. 6-11 show additional non-limiting configurations of the housing 12, the end cap 14, and the unitary pole piece 18. As shown in the non-limiting configuration of FIG. 6, the first side 24 of the housing 12 can be crimped to the top surface 30 of the end cap 14, and the second side 26 of the housing 12 can be crimped to the mounting flange 38. The illustrated end cap 14 may not include the cap recesses 28 and the illustrated mounting flange 38 may not define a stepped profile. As shown in the non-limiting configuration of FIG. 7, the first side 24 of the housing 12 can be crimped to the top surface 30 of the end cap 14, and the second side 26 of the housing 12 can be press-fit to the mounting flange 38. The illustrated end cap 14 may not include the cap recesses 28 and the illustrated mounting flange 38 may not define a stepped profile.

Figure 8:
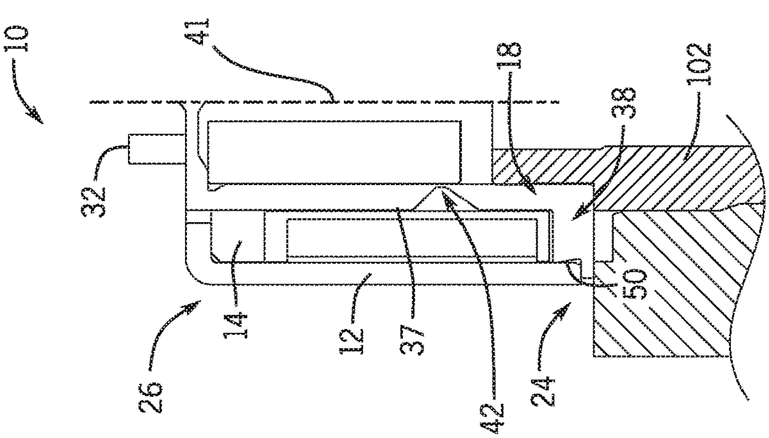
FIG. 8 is a schematic illustration of an electromagnetic actuator with a housing crimped to a flange on a pole piece and press-fit to an end cap according to one embodiment of the present invention.
Figure 11:
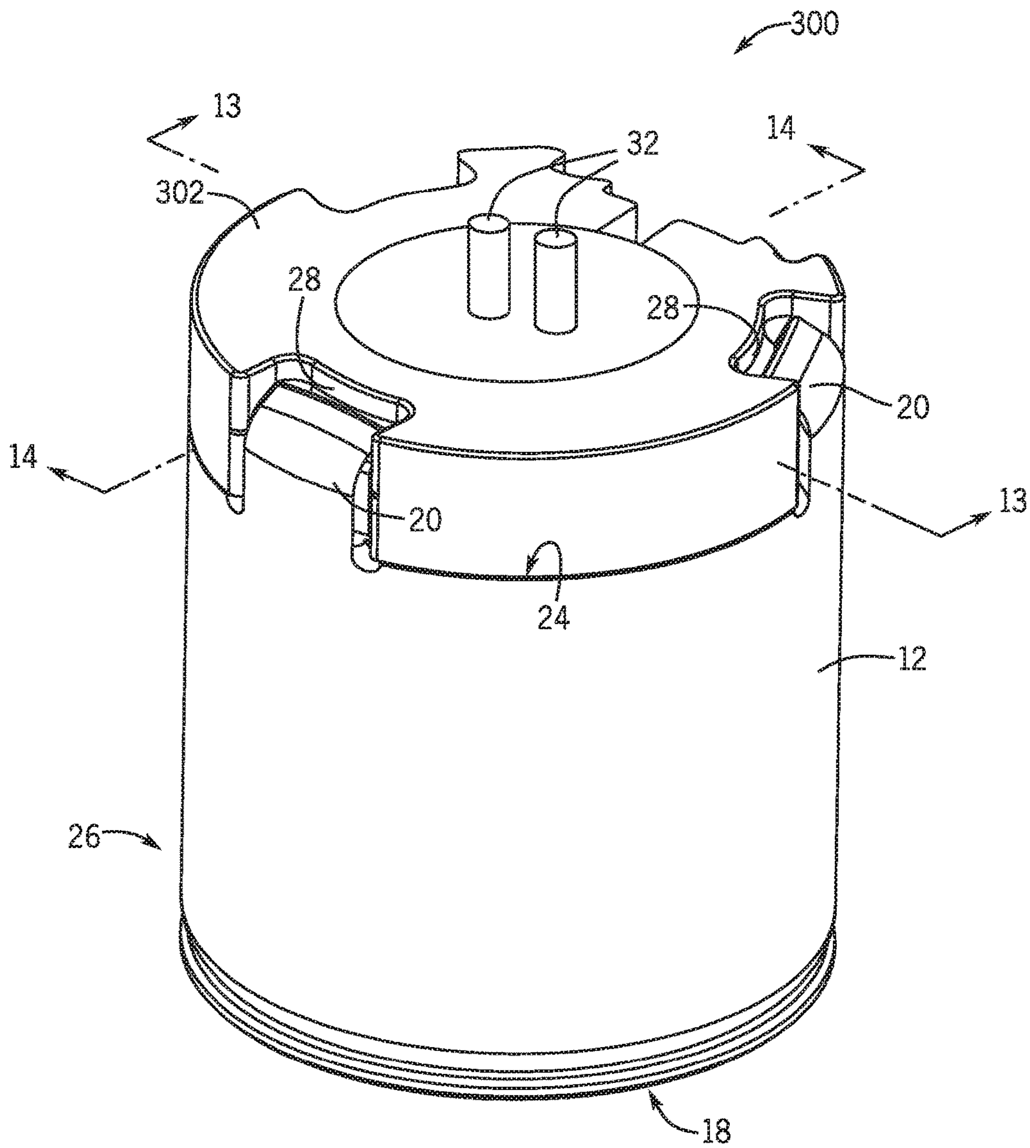
FIG. 11 is a perspective view of an electromagnetic actuator according to another embodiment of the present invention.
Figure 12:
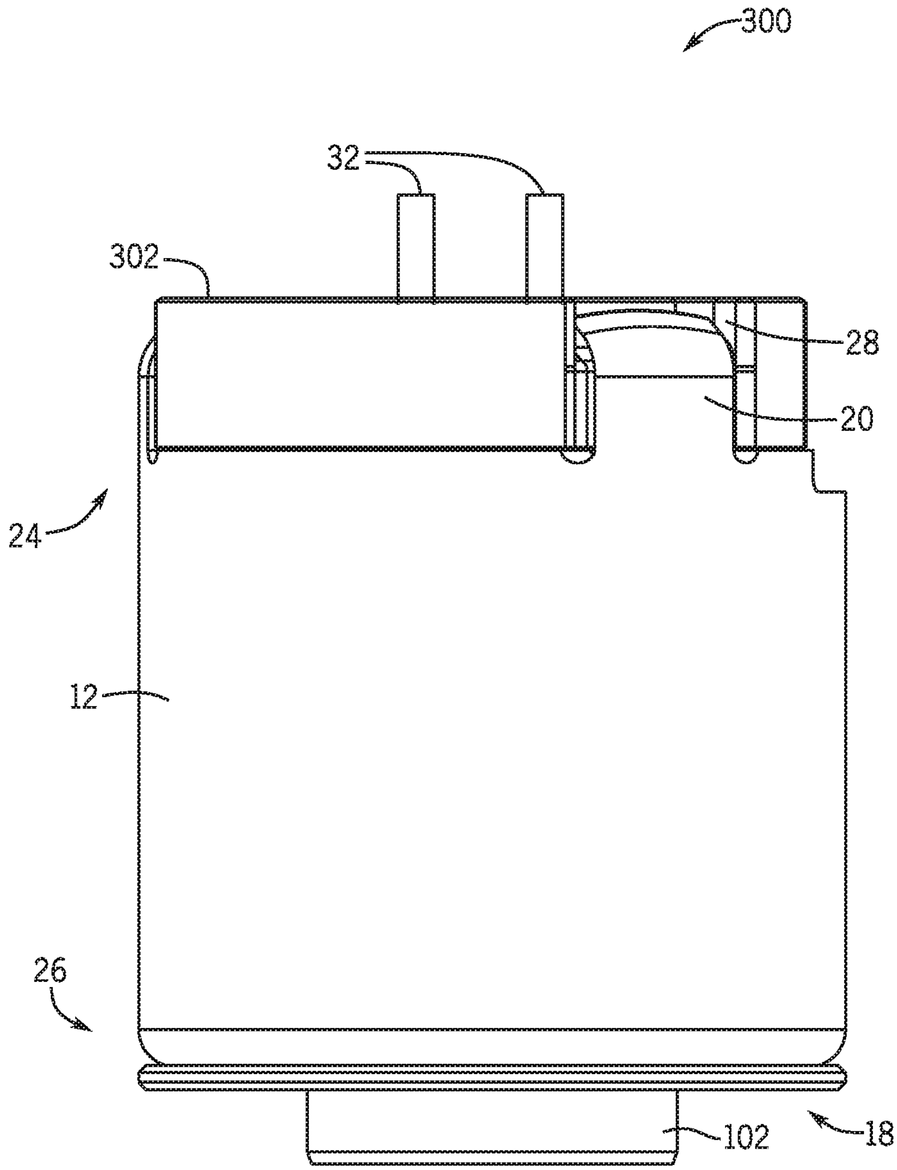
FIG. 12 is a side view of the electromagnetic actuator of FIG. 11.
Figure 13:
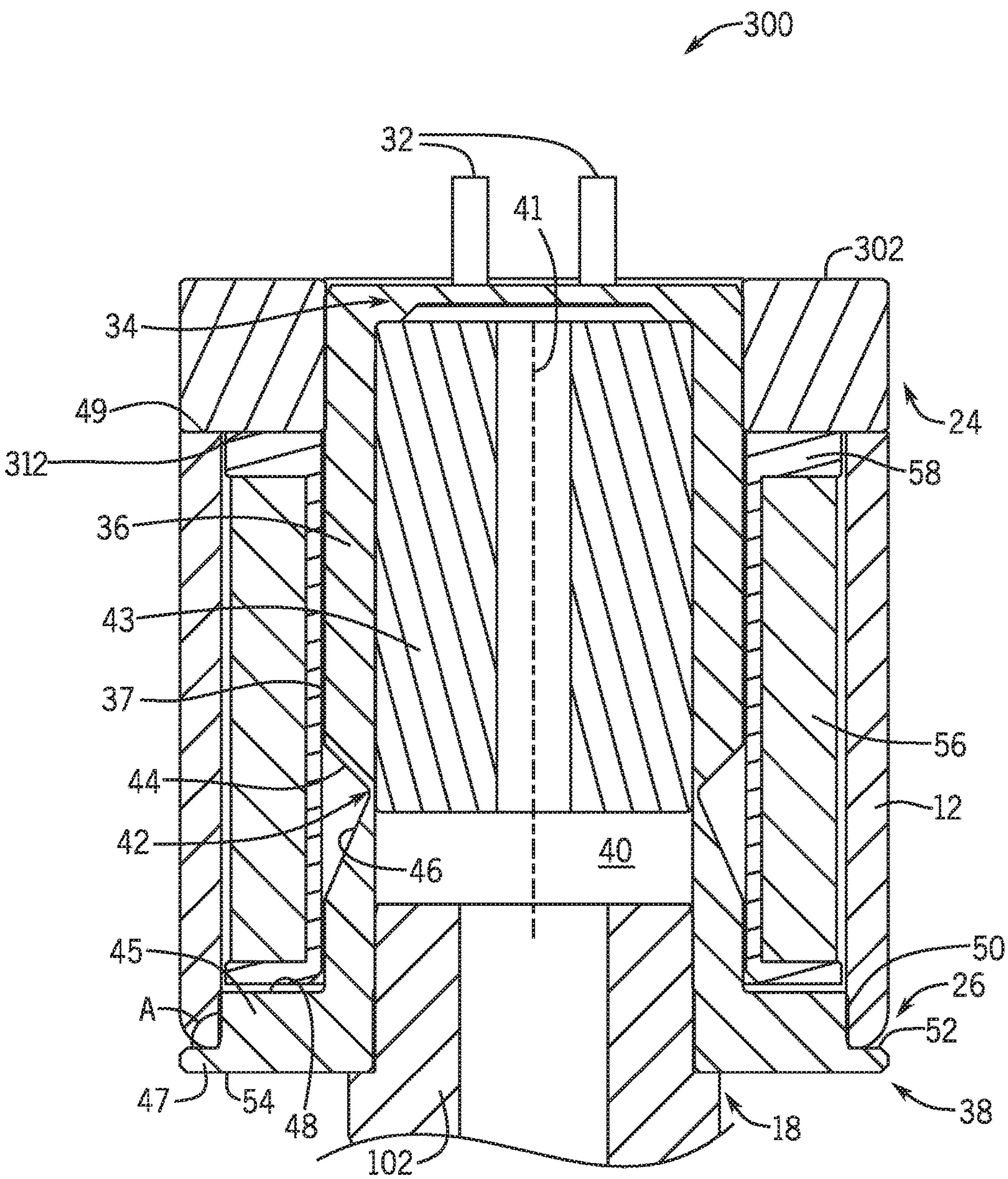
FIG. 13 is a cross-sectional view of the electromagnetic actuator of FIG. 11 taken along line 13-13.
Figure 14:
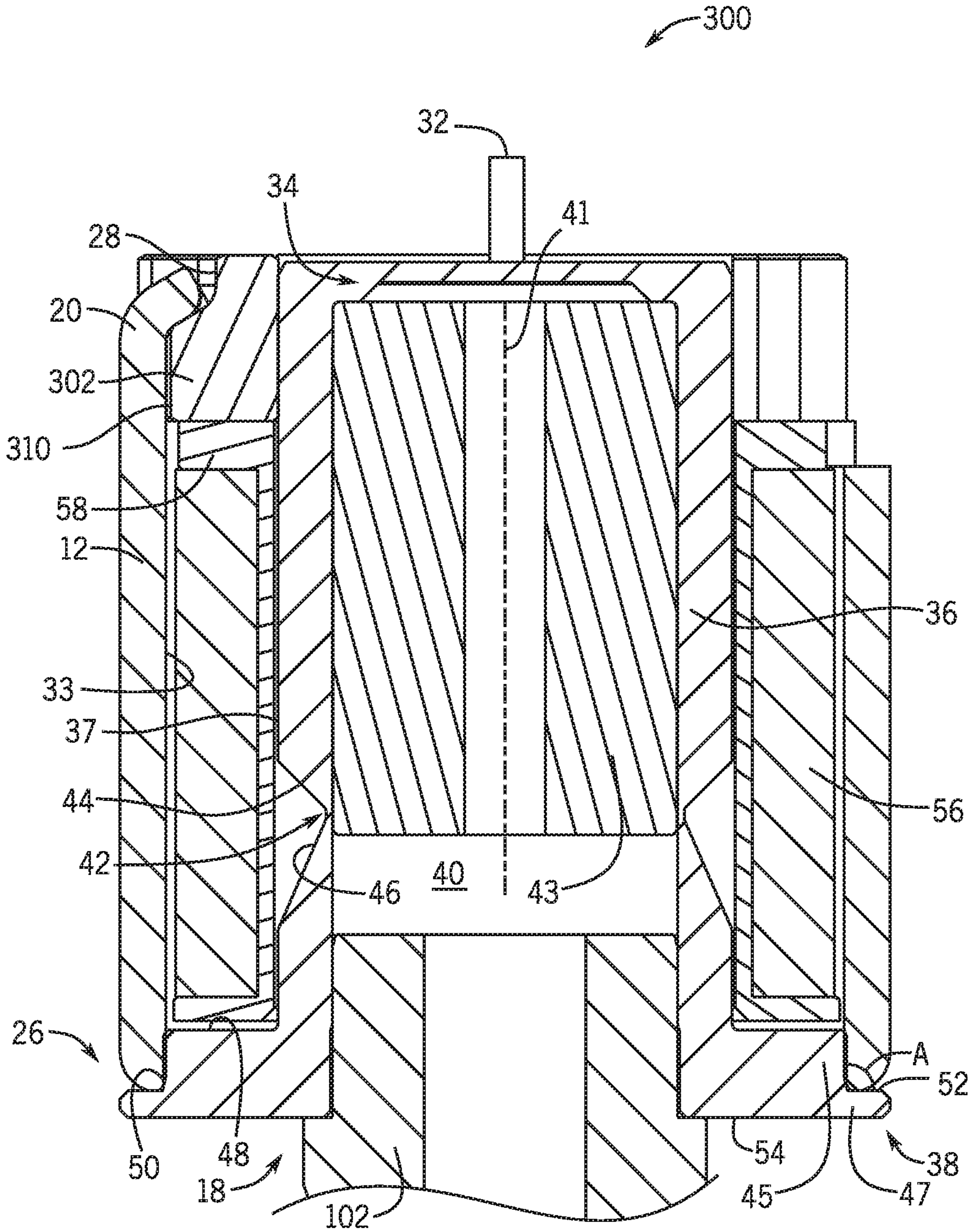
FIG. 14 is a cross-sectional view of the electromagnetic actuator of FIG. 11 taken along line 14-14.
Figure 15:
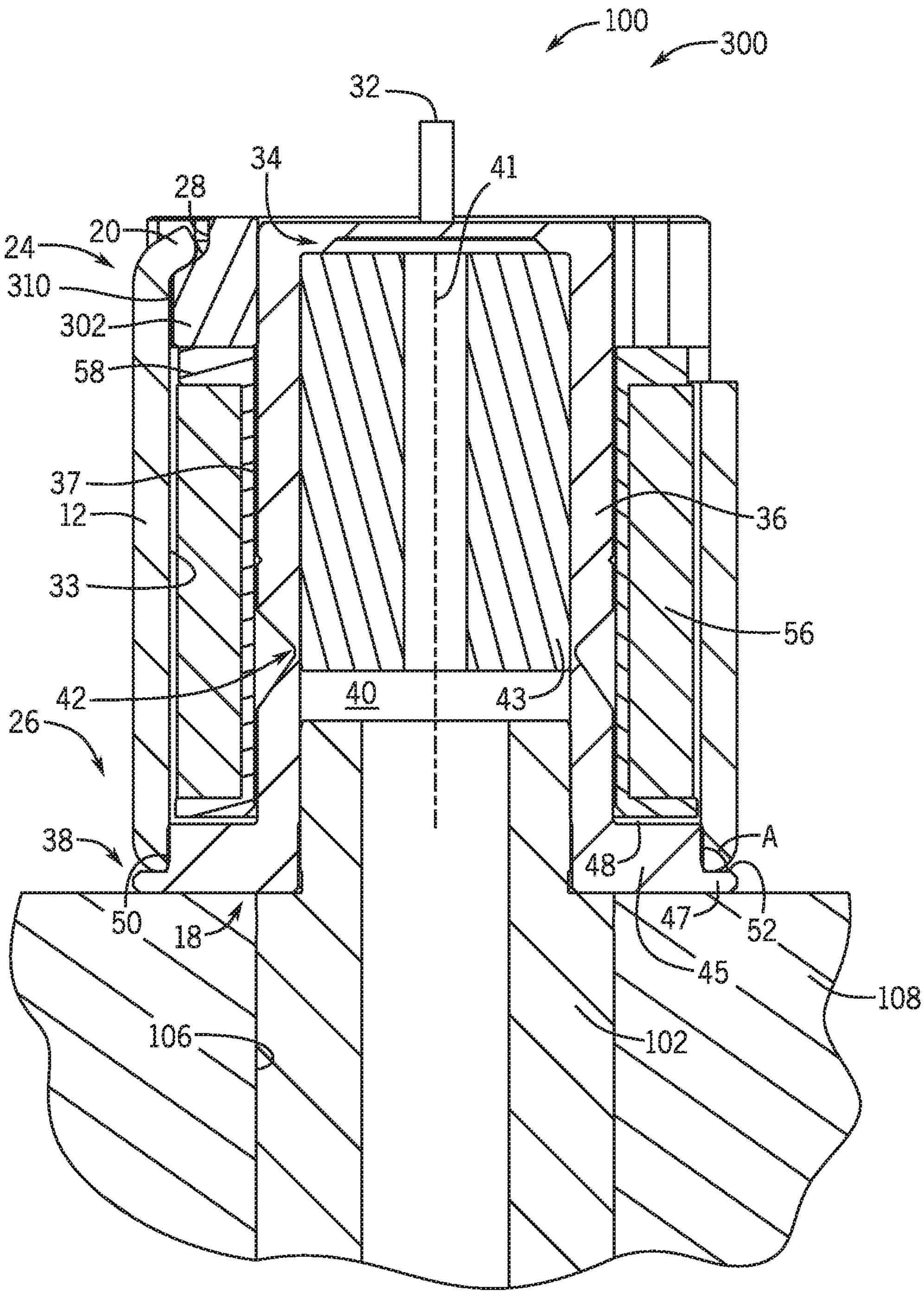
FIG. 15 is a schematic illustration of the electromagnetic actuator of FIG. 11 integrated into a control valve according to one embodiment of the present invention.

As shown in the non-limiting configuration of FIG. 8, the first side 24 of the housing 12 can extend around and engage the end cap 14 and the second side 26 of the housing 12 can be crimped to the angle surface 50 of the mounting flange 38. The illustrated housing 12 can be stamped or molded to define the shape of the second side 26. As shown in the non-limiting configuration of FIG. 9, the first side 24 of the housing 12 can extend around and engage a housing flange 202 extending from the unitary pole piece 18 adjacent to the first end 34. The second side 26 of the housing 12 can be crimped to the angled surface 50 of the mounting flange 38.

Figure 10:
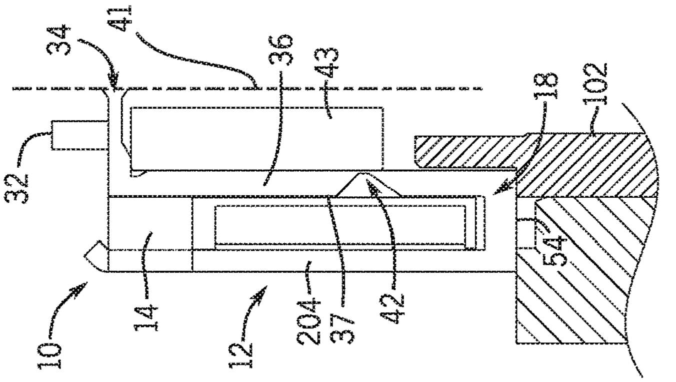
FIG. 10 is a schematic illustration of an electromagnetic actuator with a housing and a unitary pole piece formed integrally according to yet another embodiment of the present invention.
Figure 9:
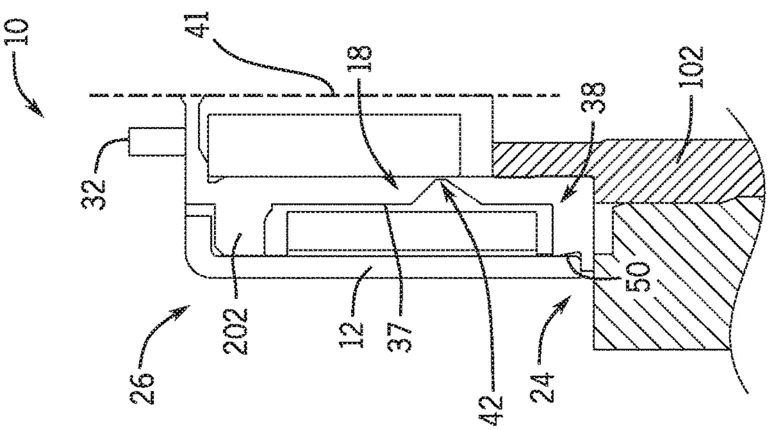
FIG. 9 is a schematic illustration of an electromagnetic actuator with a housing crimped to a flange on a pole piece and molded over a bobbin according to yet another embodiment of the present invention.

As shown in the non-limiting configuration of FIG. 10, the housing 12 and the unitary pole piece 18 may be integrally formed. That is, the housing 12 and the unitary pole piece 18 may be a single component. In this non-limiting configuration, the unitary pole piece 18 can include a housing portion 204 that extends axially toward the end cap 14 from a distal end of the mounting flange 38. The housing portion 204 may extend axially upward to the end cap 14 and may be, for example, crimped to the end cap 14 to retain the end cap 14.

FIGS. 11-15 illustrate an electromagnetic actuator 300 according to another embodiment of the present invention. The electromagnetic actuator 300 can be similar to the electromagnetic actuator 10 described above, excepted as described below or is apparent from the figures. Similar components between the electromagnetic actuator 300 and the electromagnetic actuator 10 are labeled with like reference numerals. As show in FIGS. 11-15, the second side 26 of the housing 12 of the electromagnetic actuator 300 may not include the plurality of pole piece protrusions 22 but, instead, define a substantially uninterrupted profile dimensioned to be press-fit to the unitary pole piece 18. In order to facilitate the press-fit between the second side 26 of the housing 12 and the unitary pole piece 18, the angled surface 50 of the unitary pole piece 18 can extend substantially perpendicularly toward the housing surface 52. That is, the angle A defined between the angled surface 50 and the housing surface 52 can be approximately 90°. The press-fit arrangement between the second side 26 of the housing 12 and the unitary pole piece 18 can improve magnetic contact between the housing 12 and the unitary pole piece 18, thereby reducing potential air gaps therebetween. As is known in the art, air gaps in a magnetic flux path can result in reduced magnetic efficiency. Thus, the improved magnetic contact between the housing 12 and the unitary pole piece 18 can result in improved magnetic efficiency and therefore improved force output. Further, the improved magnetic contact between the housing 12 and the unitary pole piece 18 can reduce the variation in force output by the electromagnetic actuator 300 due to improved manufacturability.

Figure 16:
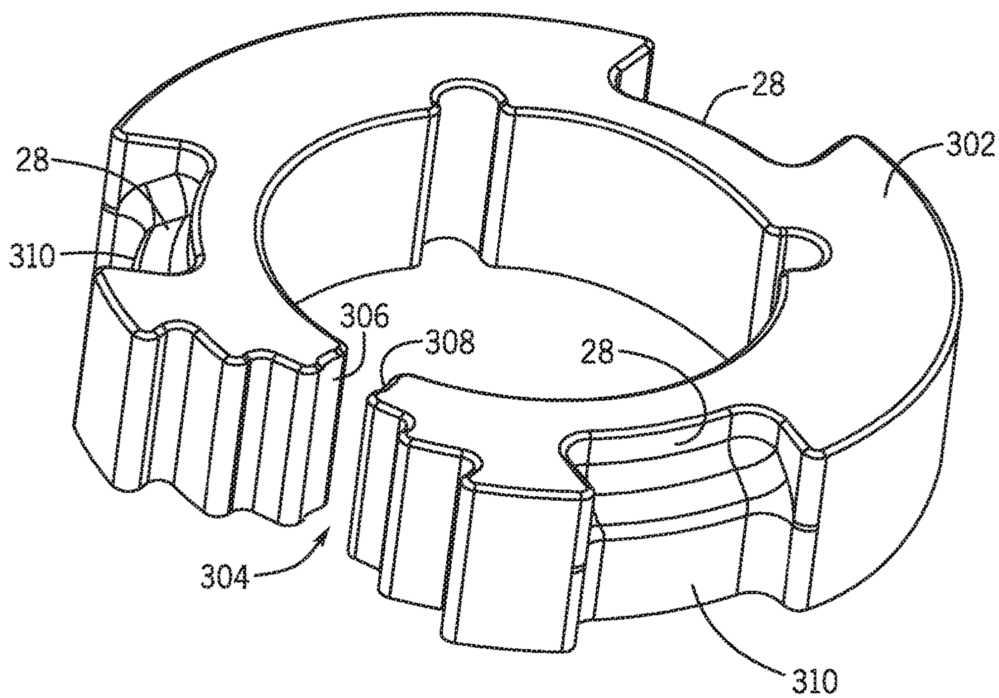
FIG. 16 is a perspective view of an end cap of the electromagnetic actuator of FIG. 11.

With specific reference to FIG. 16, the electromagnetic actuator 300 can include an end cap 302 that defines a generally split shape. That is, the end cap 302 can define a generally round shape with a split, or gap, 304 arranged therein. In other words, the end cap 302 can include a first end 306 and a second end 308 where the first end 306 can be spaced from the second end 308 such that the gap 304 can be arranged therebetween. Similar to the end cap 14, described above, the end cap 302 can be fabricated from a magnetic material (e.g., magnetic steel, iron, nickel, etc.), and can include the plurality of cap recesses 28 arranged circumferentially around a periphery thereof. The plurality of cap recesses 28 can be dimensioned such that a corresponding one of the plurality of end cap protrusions 20 of the housing 12 can be crimped thereon.

The split design of the end cap 302 can enable the end cap 302 to be press-fit around the unitary pole piece 18. Specifically, the end cap 302 can be press-fit around the outer surface 37 of the side wall 36 of the unitary pole piece 18 adjacent to the first end 34. The press-fit configuration can improve magnetic contact between the end cap 302 and the unitary pole piece 18, thereby reducing potential air gaps therebetween. As is known in the art, air gaps in a magnetic flux path can result in reduced magnetic efficiency. Thus, the improved magnetic contact between the end cap 302 and the unitary pole piece 18 can result in improved magnetic efficiency and therefore improved force output. Further, the improved magnetic contact between the end cap 302 and the unitary pole piece 18 can reduce the variation in force output by the electromagnetic actuator 300 due to improved manufacturability.

In addition to the magnetic improvements provided by the press-fit between the end cap 302 and the unitary pole piece 18, the split design of the end cap 302 can also reduce an assembly force required to couple the end cap 302 around the unitary pole piece 18. This reduced press-fit assembly force can further minimize a load on the choke portion 42 of the unitary pole piece 18 during assembly and operation, which can enable the choke portion 42 to define a smaller radial cross-sectional area to aid in the magnetic performance of the unitary pole piece 18.

The press-fit of the housing 12 onto the unitary pole piece 18 can also control the load applied to the choke portion 42 during assembly. That is, the retention device (not shown) can induce an axial installation force on the end cap 302 in a direction toward the application structure 108. The installation force may be transferred from the end cap 14 axially through the housing 12 to the mounting flange 38. Thus, an installation load, or force, acting on the electromagnetic actuator 300 can be distributed from the end cap 14 through the housing 12 and to the mounting flange 38 of the unitary pole piece 18 thereby bypassing the choke portion 42 of the unitary pole piece 18. This can enable the choke portion 42 to define a smaller cross-sectional area to aid in the magnetic performance of the electromagnetic actuator 10.

Further, the design of the electromagnetic actuator 10 may further control a load applied to the choke portion 42 via the interaction between the housing 12 and the end cap 302. Prior to crimping, an interface between the end cap 302 and the housing 12 may be governed by an axial contact. That is, an axial surface 312 of the end cap 302 may be configured to interact with the axial surface 49 of the housing 12 during assembly of the electromagnetic actuator 10. The interaction between the axial surface 312 of the end cap 302 and the axial surface 49 of the housing 12 can occur on an axial plane (i.e., a plane that is perpendicular to the central axis 41). The axial engagement between the housing 12 and the end cap 302 allows for radial misalignment between the housing 12, the end cap 14, and the unitary pole piece 18, which eliminates bending moments that may have been applied to the choke portion 42 during manufacture. In addition, a radial gap can be arranged between an outer surface 310 of the end cap 302 and the inner surface 33 of the housing 12 adjacent to the plurality of end cap protrusions 20. This radial gap may further allow radial misalignment between the housing 12, the end cap 14, and the unitary pole piece 18 during assembly of the electromagnetic actuator 10.

As is known in the art, in some configurations, an electromagnetic actuator may include a pole piece and a c-pole, which are separated axially such that a gap exists therebetween. The use of the pole piece and c-pole as separate components may lead to misalignment between these components during manufacture or operation. Any misalignment between the pole piece and c-pole can lead to armature side loading and thereby to armature wear, or tipping, and increased hysteresis. As described above, the present disclosure provides an electromagnetic actuator 10,300 having a unitary pole piece 18. The use of a unitary pole piece 18 eliminates any potential misalignment between a pole piece and a c-pole as they are fabricated from a single component. Thus, the systems and methods for an electromagnetic actuator having a unitary pole piece described herein may eliminate or reduce armature wear, or tipping, and increased hysteresis due to pole piece/c-pole misalignment. Further, the design and properties of the electromagnetic actuators 10 and 300 described herein control, or significantly reduce, any potential load applied to the choke portion 42 of the unitary pole piece 18 during manufacture and/or in application. This enables the choke portion 42 to define minimal radial cross-sectional thickness thereby improving the magnetic performance of the electromagnetic actuators 10 and 300.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. An electromagnetic actuator comprising:

a housing;

a unitary pole piece at least partially arranged within the housing, the unitary pole piece including a first end, a side wall defining a choke portion, and a mounting surface extending from a distal end of the side wall, wherein the first end and the side wall define an armature recess;

an end cap arranged around the unitary pole piece adjacent to the first end, wherein the end cap defines a split design;

an armature slidably received with the armature recess of the unitary pole piece; and a wire coil arranged within the housing and positioned around the armature.

2. The electromagnetic actuator of claim 1, wherein the mounting flange defines a substantially stepped profile.

3. The electromagnetic actuator of claim 1, wherein the mounting flange includes an angled surface.

4. The electromagnetic actuator of claim 3, wherein one side of the housing is crimped to the angled surface.

5. The electromagnetic actuator of claim 1, wherein the mounting flange includes a housing surface configured to at least partially engage the housing.

6. The electromagnetic actuator of claim 1, wherein one side of the housing is press-fit to the mounting flange of the unitary pole piece.

7. The electromagnetic actuator of claim 6, wherein the mounting flange defines a substantially stepped profile.

8. The electromagnetic actuator of claim 1, wherein the end cap is press-fit around the side wall of the unitary pole piece adjacent to the first end of the unitary pole piece.

9. The electromagnetic actuator of claim 1, wherein the end cap includes a first end and a second end spaced from the first end such that a gap is arranged therebetween.

10. The electromagnetic actuator of claim 1, wherein the choke portion defines a reduced radial thickness compared to the side wall.

11. The electromagnetic actuator of claim 1, wherein the housing and the unitary pole piece are integrally formed.

12. The electromagnetic actuator of claim 11, wherein the housing defines a housing portion of the unitary pole piece that extends axially from a distal end of the mounting flange toward the end cap.

13. The electromagnetic actuator of claim 1, wherein the armature recess is formed by a cavity defined by the first end and the side wall of the unitary pole piece.

14. The electromagnetic actuator of claim 1, wherein the first end, the side wall, and the mounting surface define a continuous surface to seal the armature within the armature recess.

15. The electromagnetic actuator of claim 1, wherein an engagement between the mounting surface and an application structure is configured to provide a seal therebetween.

16. The electromagnetic actuator of claim 1, wherein an installation force applied to the end cap is configured to bypass the choke portion of the unitary pole piece.

17. The electromagnetic actuator of claim 1, wherein an interface between the end cap and the housing is arranged in an axial plane.

18. A control valve comprising:

a valve body;

an electromagnetic actuator coupled to the valve body, the electromagnetic actuator including:

a housing;

a unitary pole piece at least partially arranged within the housing, the unitary pole piece including a first end, a side wall defining a choke portion, and a mounting surface extending from a distal end of the side wall, wherein the first end and the side wall define an armature recess;

an end cap arranged around the unitary pole piece adjacent to the first end, wherein the end cap defines a spilt design;

an armature slidably received with the armature recess of the unitary pole piece; and a wire coil arranged within the housing and positioned around the armature, wherein the valve body is at least partially arranged within the armature recess of the unitary pole piece.

19. The control valve of claim 18, wherein the mounting flange defines a substantially stepped profile.

20. The control valve of claim 18, wherein the mounting flange includes an angled surface.

21. The control valve of claim 20, wherein one side of the housing is crimped to the angled surface.

22. The control valve of claim 18, wherein the mounting flange includes a housing surface configured to at least partially engage the housing.

23. The control valve of claim 18, wherein one side of the housing is press-fit to the mounting flange of the unitary pole piece.

24. The control valve of claim 23, wherein the mounting flange defines a substantially stepped profile.

25. The control valve of claim 18, wherein the end cap is press-fit around the side wall of the unitary pole piece adjacent to the first end of the unitary pole piece.

26. The control valve of claim 18, wherein the end cap includes a first end and a second end spaced from the first end such that a gap is arranged therebetween.

27. The control valve of claim 18, wherein the choke portion defines a reduced radial thickness compared to the side wall.

28. The control valve of claim 18, wherein the housing and the unitary pole piece are integrally formed.

29. The control valve of claim 28, wherein the housing defines a housing portion of the unitary pole piece that extends axially from a distal end of the mounting flange toward the end cap.

30. The control valve of claim 18, wherein the armature recess is formed by a cavity defined by the first end and the side wall of the unitary pole piece.

31. The control valve of claim 18, wherein the first end, the side wall, and the mounting surface define a continuous surface to seal the armature within the armature recess.

32. The control valve of claim 18, wherein an engagement between the mounting surface and an application structure is configured to provide a seal therebetween.

33. The control valve of claim 18, wherein an installation force applied to the end cap is configured to bypass the choke portion of the unitary pole piece.

34. The control valve of claim 18, wherein an interface between the end cap and the housing is arranged in an axial plane.

* * * * *